United States Patent [19]

Ziauddin et al.

[11] Patent Number: 5,802,521

[45] Date of Patent: Sep. 1, 1998

[54] METHOD AND APPARATUS FOR DETERMINING DISTINCT CARDINALITY DUAL HASH BITMAPS

[75] Inventors: Mohamed Ziauddin, Fremont, Calif.; Michael T. Ong, Andover, Mass.

[73] Assignee: Oracle Corporation, Redwood Shores, Calif.

[21] Appl. No.: 726,957

[22] Filed: Oct. 7, 1996

[51] Int. Cl.$^6$ ........................................ G06F 7/00
[52] U.S. Cl. ............... 707/101; 707/1; 707/2; 707/7; 707/100; 395/200.31
[58] Field of Search ................. 707/1–2, 6–10, 707/100–104, 200–206, 500

[56] References Cited

U.S. PATENT DOCUMENTS

| | | | |
|---|---|---|---|
| 5,557,785 | 9/1996 | Lacquit et al. | 707/104 |
| 5,625,773 | 4/1997 | Bespalko et al. | 707/500 |
| 5,673,252 | 9/1997 | Johnson et al. | 1/1 |

*Primary Examiner*—Thomas G. Black
*Assistant Examiner*—David Yink Jung
*Attorney, Agent, or Firm*—Wagner, Murabito & Hao

[57] ABSTRACT

A method and apparatus for determining distinct cardinality of a data sample using dual hash bitmaps. Two different bitmaps determine the distinct cardinality of the data sample (e.g., a column of data within a data table of a database). A small sized bitmap, $M*sqrt(C*K)$, is used where M is a programmable value that reduces collision error, C is the size of the column ("data sample size"), and K is a key density value. Once selected, both M and K are constant. Sample entry values are hashed by a hash function and a modulo function determines an entry into the first bitmap. Based on the bitmap's bit entries, a first counter is updated, or not, to maintain a first distinct cardinality value. A large bitmap is used having a size, $M*C$, but only a small fraction is actually used, $M*sqrt(C*K)$. Only hashed column entries falling inside the fraction are processed as above to maintain a second counter. At the end of the data sample entry processing, the second counter is extrapolated to the large bitmap size. Expected collision error compensation is computed and compensated for the first and second counters. Distribution error is computed for the second counter and added with its compensated collision error. The total errors of the first and second counters are compared to select an output distinct cardinality. The distinct cardinality measurement requires sub-linear increase in memory for each linear increase in sample size.

23 Claims, 10 Drawing Sheets

300(Cont.)

METHOD AND APPARATUS FOR DETERMINING DISTINCT CARDINALITY DUAL HASH BITMAPS

BACKGROUND OF THE INVENTION

(1). Field of the Invention

The present invention relates to the field of computer systems. More specifically, the present invention relates to the field of measurement systems for database characteristics.

(2). Prior Art

Computer implemented relational database management systems (e.g., RDBMS) are well known in the art. Such database systems commonly employ data tables that contain columns and rows. Columns can also be referred to as containing data entries. Herein, a column of data entries is referred to as a dataset or "data sample." A data sample is a collection of data entries. each entry is either a value from a single column or a combination of values from a group of columns. A typical RDBMS, in addition to maintaining the data of a particular database, also maintains a set of statistics regarding the data. These statistics are useful in efficiently accessing, manipulating, and presenting the stored data.

One type of statistic maintained by a computer implemented RDBMS is the distinct cardinality of a particular data sample of data within a particular database. The distinct cardinality is usually maintained within some predefined and acceptable error limit and refers to the number of distinct entries in a data sample. For instance, if the data sample contains addresses within a local phone book, the distinct cardinality of the data sample including the street addresses might be very high since street addresses in a phone book are each generally unique. However, the distinct cardinality of the data sample including the city might be low since a typical local phone book covers a geographic area including only a small number of cities. In the latter case, most of the data sample includes the same city names repeated over and over.

An optimizer is an integral component of an RDBMS system that analyzes every user query (request for select data) and determines the most efficient way of accessing data from various tables and produces the query result. The distinct cardinality provides valuable information to an optimizer of an RDBMS because it allows the optimizer to determine: the number of distinct groups of data in a data sample; the resulting cardinality after an equi-join operation; and the resulting cardinality after all equality selects are applied to a data sample. The distinct cardinality is also very useful in providing efficient computer implemented procedures for computing approximate aggregates such as the approximate count of projects in an organization, the average number of employees per department, the number of distinct customer-order pairs, etc. Therefore, it is desirable to provide an efficient and effective system for determining the distinct cardinality of a data sample.

Two methods of determining the distinct cardinality ("distinct cardinality") of a data sample have been used. The first method utilizes data sorting and the second method utilizes a bitmap with a hashing procedure ("a hash bitmap"). FIG. 1A illustrates a logical diagram of a sorting method of the prior art. The entries, e.g., 10(1) to 10(C), of a data column 10 are sorted (e.g., alphanumerically) to arrive at a sorted column 12. The RDBMS then processes each entry in order, e.g., 12(1) to 12(C), counting the number of distinct entries by ignoring duplicates. At the completion of this process, the number of distinct entries is the measure of the distinct cardinality of data sample 10. A drawback of the sorting approach is that a large amount of memory and processor resources are consumed in order to perform the initial data sort and the subsequent count of the distinct entries. Specifically, as the data sample size, C, increases linearly, the amount of computer resources increases at greater than a linear rate. With only moderate data sample sizes, the prior art sorting system of FIG. 1A quickly becomes an impractical method of determining distinct cardinality because: (1) too much memory is required within a typical VMS (virtual memory system) computer system; and (2) too much processing time is consumed.

FIG. 1B illustrates a logical diagram of the second method of determining distinct cardinality which utilizes a hash procedure 20 and a bitmap 14. The bitmap 14 is stored in computer readable memory and contains x addressable elements and each element contains only one bit. An element represents a distinct data value within the data sample. Each entry of a data sample is input over data path 16 into hash procedure 20 which generates a hash value. Hash procedures typically generate a fixed length pseudo unique value for each unique input. At modulo procedure 22, the output of hash procedure 20 is then divided by the length (e.g., x) of the bitmap 14 and the remainder is output over data path 24. The output of modulo procedure 22 represents an index (or address) into the bitmap 14. Upon each cycle, an entry of bitmap 14 is read, if the entry is a zero, then it is set to a "1" and a distinct cardinality counter is incremented. If the entry is a "1," then it is assumed to be a duplicate value and ignored by the distinct cardinality counter. Each entry of the data sample is input to data path 16 and processed as described above.

An advantage of the bitmap hashing method of FIG. 1B over the system of FIG. 1A is that memory and processing resources increase only linearly for a linear increase in data sample size. However, the system of FIG. 1B introduces a "collision error" in the determined distinct cardinality. Collision error results when two different input values are hashed by the hash procedure 20 to the same output value. In order to reduce collision error, the size of the bitmap 14 needs to be set to some relatively large value. Since the distinct cardinality of a data sample is not known a priori, the size of bitmap 14 is set proportionally to the data sample size, C. A multiplier is typically used to further increase this bitmap 14 size. For instance, the size, x, of the bitmap 14 becomes M*C where M is the multiplier and C is the size of the data sample. Unfortunately, setting the size of bitmap 14 based on the data sample size, C, is problematic because as C increases, so too does the memory requirements of the bitmap 14. The same is true if M increases. If the memory requirements of bitmap 14 increase to a level where the bitmap 14 does not entirely fit within physical memory of the RDBMS, then VMS paging is required which greatly increases the processing time required to determine the distinct cardinality under the system of FIG. 1B.

Accordingly, what is needed is an efficient and accurate system for determining distinct cardinality of a data sample. What is needed is an efficient and accurate system for determining distinct cardinality of a data sample that requires only a sublinear increase in computer resources for a linear increase in data sample size. What is needed further is a system as above and having the processing efficiency as described with respect to FIG. 1B but requires less memory than the system of FIG. 1B. The present invention for determining distinct cardinality provides the above features, and others not necessarily recited above but clear within further discussions of the present invention herein.

SUMMARY OF THE INVENTION

A method and apparatus are described for determining distinct cardinality of a data sample using dual hash bitmaps. The present invention employs two different bitmaps to determine the distinct cardinality of a data sample. The distinct cardinality represents the number of distinct entries within the data sample. A first bitmap of a small size, M*sqrt(C*K), is used where M is a programmable value that reduces collision error, C is the size of the column ("data sample size"), and K is a key density value. Once selected for a particular data sample, both M and K are constant. Column entry values are hashed by a hash function and a modulo function determines a position into the first bitmap. Based on the data stored within the bitmap's bit positions, a first counter is updated or not to maintain the distinct cardinality as represented by the first bitmap. A second, separate, bitmap is also used having a larger size, M*C, but only a small fraction of the second bitmap is actually used, M*sqrt(C*K). Hashed column entries that fall outside of the fractional bitmap are ignored and those falling inside are processed as above to maintain a second counter. At the end of the data sample processing, the second counter is extrapolated to reflect the entire second bitmap size. Expected collision error is computed for the first and second counter. Expected distribution error is computed and added to the collision error of the second counter. Then the total error for the first and second counter are compared against each other, and the counter with the lessor error is selected as the output distinct cardinality of the data sample. The present invention provides a distinct cardinality measurement that does not utilize linearly more memory and computer resources for a linear increase in data sample size, but rather uses increased memory at a sub-linear rate (e.g., square root) for each linear increase in data sample size.

More specifically, in a computer system having a processor coupled to a bus and a computer readable memory unit coupled to the bus, a method for determining distinct cardinality of a data sample, embodiments of the present invention include a method comprising the steps of: (a) receiving the data sample, the data sample containing C entries; (b) determining a first distinct cardinality value of the data sample using a first bitmap, the first bitmap comprising M*[sqrt(C*K)] entries where M is a multiplier constant value and K is a key density constant value; (c) determining a second distinct cardinality value of the data sample using a fractional bitmap that is a fraction of a second bitmap, the second bitmap comprising M*C logical entries and the fractional bitmap containing M*[sqrt(C*K)] entries; and (d) selecting between the first distinct cardinality value and the second distinct cardinality value as the distinct cardinality of the data sample, wherein the first bitmap and the fractional bitmap are separate bitmaps stored within the computer readable memory unit.

DETAILED DESCRIPTION OF THE INVENTION

In the following detailed description of the present invention system and method for using dual hash bitmaps for determining distinct cardinality, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT

Figure 1A:
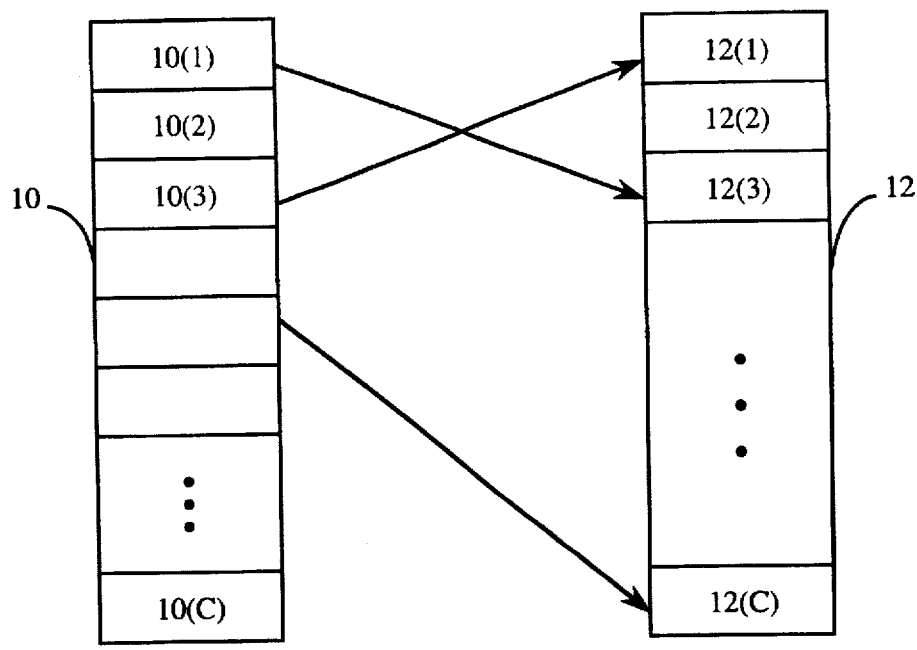
FIG. 1A is a logical diagram of a prior art sort system for determining a data sample's distinct cardinality.
Figure 1B:
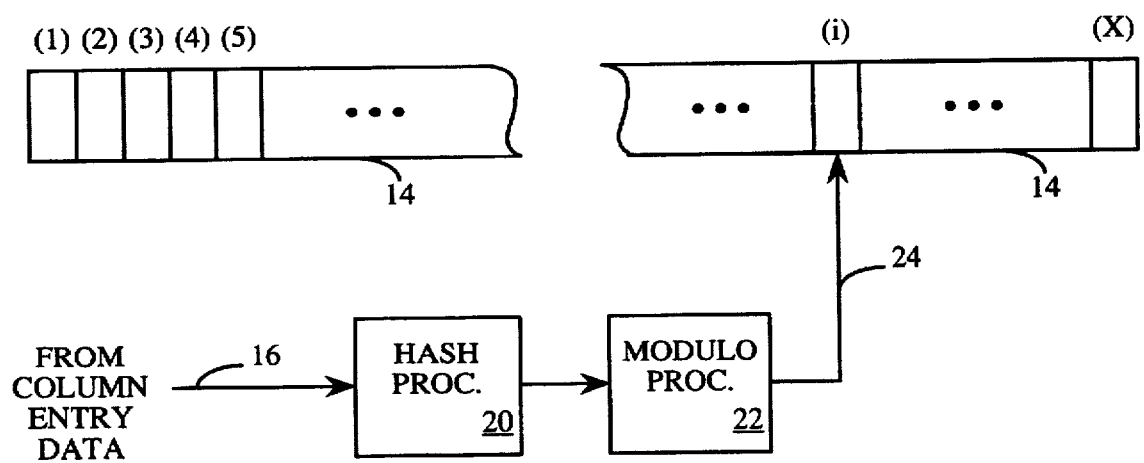
FIG. 1B is a logical diagram of a prior art bitmap hashing system for determining a data sample's distinct cardinality.
Figure 2:
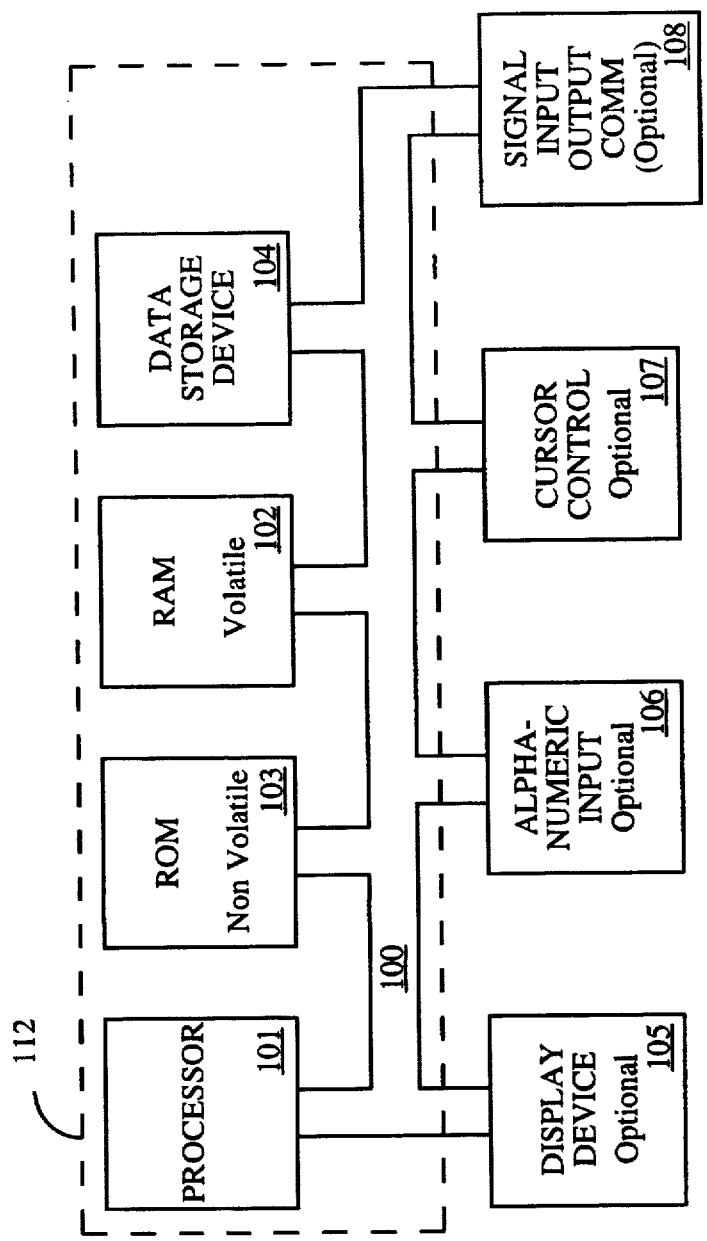
FIG. 2 illustrates a general purpose computer system utilized within the present invention system for determining distinct cardinality using dual hash bitmaps.

Refer to FIG. 2 which illustrates a computer system 112. Within the following discussions of the present invention, certain processes (e.g., processes 300, 400, and 500) and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101. In one embodiment, system 112 is a DEC Alpha computer system by Digital Equipment Corporation.

METHOD AND SYSTEM OF THE PRESENT INVENTION USING DUAL HASH BITMAPS

The present invention utilizes and maintains two hash bitmaps to determine a data sample's distinct cardinality in order to provide a sub-linear increase in computer resources to determine distinct cardinality for each linear increase in sample size.

The first hash bitmap is a small hash bitmap of size $M*sqrt(C*K)$ where M is a multiplier value that determines collision error, C is the size of the data sample and K is a key density and is the number of distinct keys hashed to the fraction bitmap described further below. The second hash bitmap is a large bitmap of size $M*C$, but only a fraction of the second hash bitmap is used. The fraction used is of size $M*sqrt(C*K)$. Therefore, the total bitmap size required for a data sample of size C is $2*M*sqrt(C*K)$. In this case, for every increase in the data sample size, C, the memory requirements grow at the square root of the data sample size increase.

Figure 3:
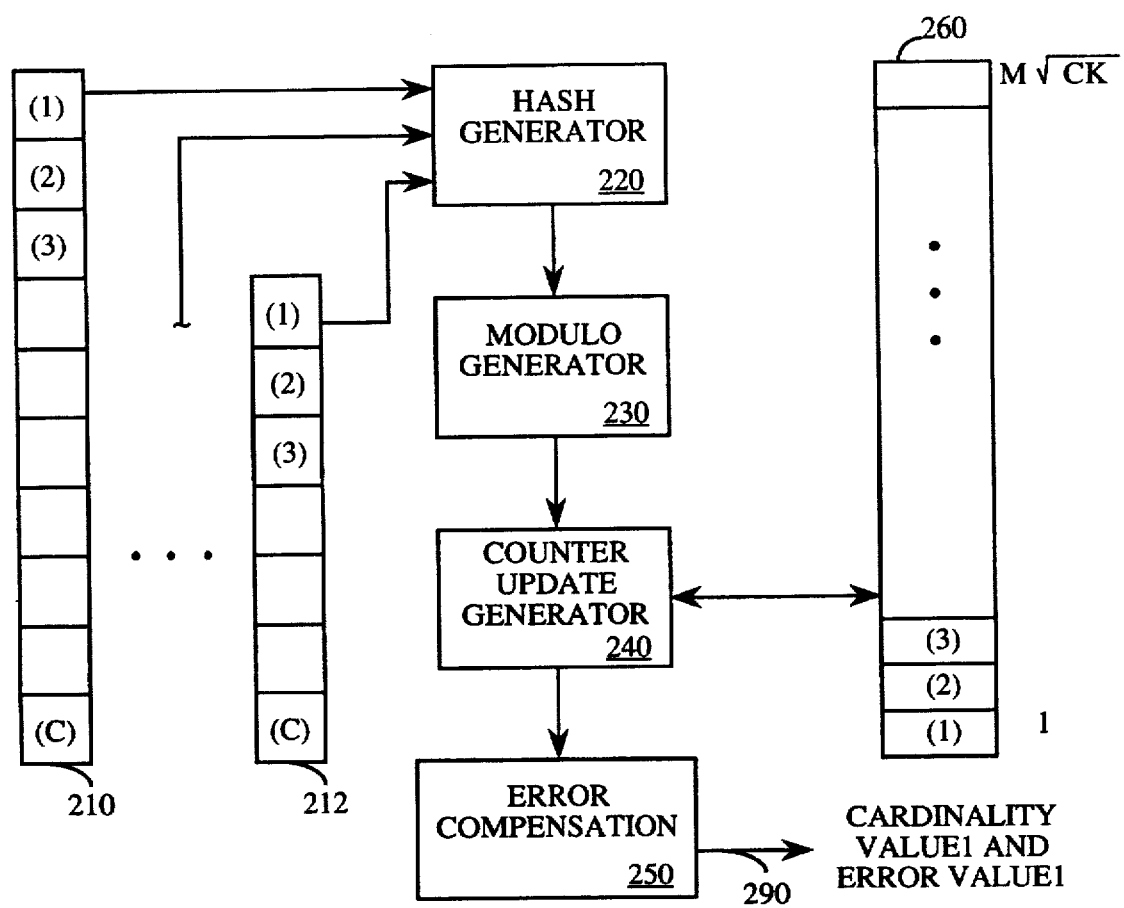
FIG. 3 is a logical block diagram illustrating data flow between processes of the present invention with respect to a first (small) bitmap used to determine distinct cardinality within the present invention.

FIG. 3 illustrates a logical block diagram and data flow diagram of the portion of the present invention that maintains a first cardinality value using the first hash bitmap. The data sample is represented as data column 210 and optionally can include more than one data column (e.g., data column 210, ..., and data column 212). The data columns 210 (and 212) each include separate entries, e.g., 210(1)–210(C). Assuming data column 210 is the data sample, the data sample size is C because there are C entries. When multiple data columns comprise the data sample, the data entry is actually a group that comprises an input combination of values from multiple columns. For instance, as shown in FIG. 3, the first entry is 210(1), ..., 212(1). The second entry is 210(2), ..., 212(2), and so on until entry 210(C), ..., 212(C) is reached. The present invention then computes the distinct cardinality of this data sample where each entry comprises a combination of data elements.

FIG. 3 includes a hash generator 220 that accepts input data entry from the data sample (e.g., column 210 or columns 210, ..., 212) "data sample 210" and generates a fixed length pseudo unique output value. A number of different hash functions can be used for block 220. In operation, a data entry is input to hash generator 220 and a hash value is then output to modulo generator block 230. The modulo generator block 230 divides the hash value output from block 220 by the next prime number following the size of the small hash bitmap 260. In this case the size of the small bitmap is $M*sqrt(C*K)$ where M and K are constants that are described further below. The value, C, is the size of the data sample 210. A number of well known procedures, one of which is shown below, can be used in one implementation of the present invention to determine the next prime number, NPN1:

$$NPN1 = NextPrime[M*sqrt(C*K)]$$

It is a standard practice in a hashing method to use a modulo generator based on a prime number. This use of a prime number reduces collision error. Once the hash value output from block 220 is divided by NPN1, block 230 then takes the remainder value, i, from the division. At counter update generator block 240, the present invention accepts the remainder value, i, from block 230 and uses this value as an index to address the ith position of the small bitmap 260.

Small bitmap 260 of FIG. 3, as discussed above, contains $M*sqrt(C*K)$ number of single bit entries, e.g., 260(1), 260(2), 260(3), ..., 260($M*sqrt(C*K)$) that are initially set to zero. Upon receiving each value i, block 240 accesses the ith position of small bitmap 260 to obtain a single bit value (0 or 1). If the value is 0, then it is set to 1 by block 240 and a first distinct cardinality counter maintained in block 240 is incrementedy one. If the value is 1, the value is left at 1 and no counter update is performed. It is appreciated that the first distinct cardinality counter is initially set to zero. Blocks 220, 230, and 240 perform the above for each entry within data sample 210.

Figure 5A:
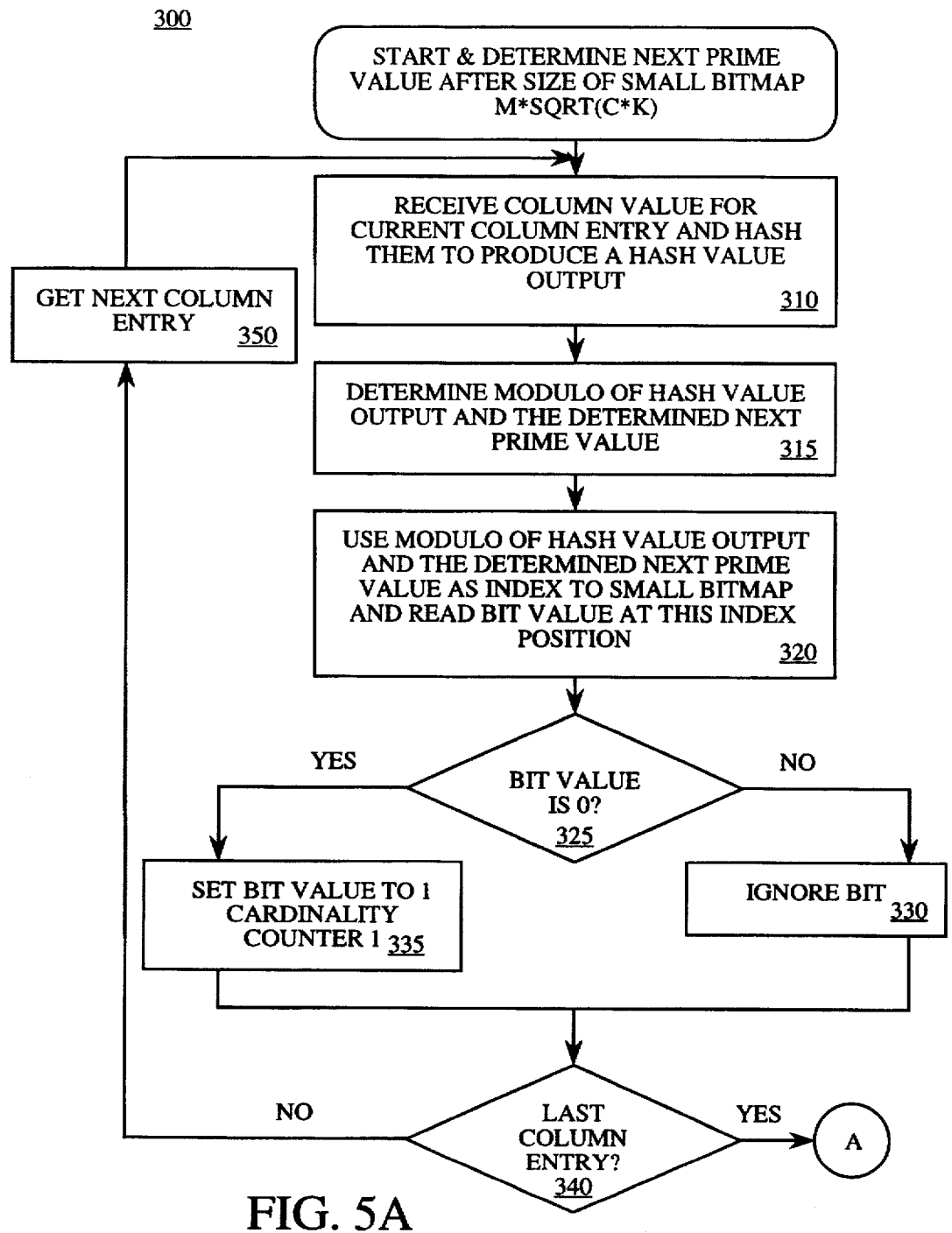
FIG. 5A and FIG. 5B illustrate steps of a process used by the present invention to maintain a distinct cardinality value for a data sample based on the first bitmap.
Figure 5B:
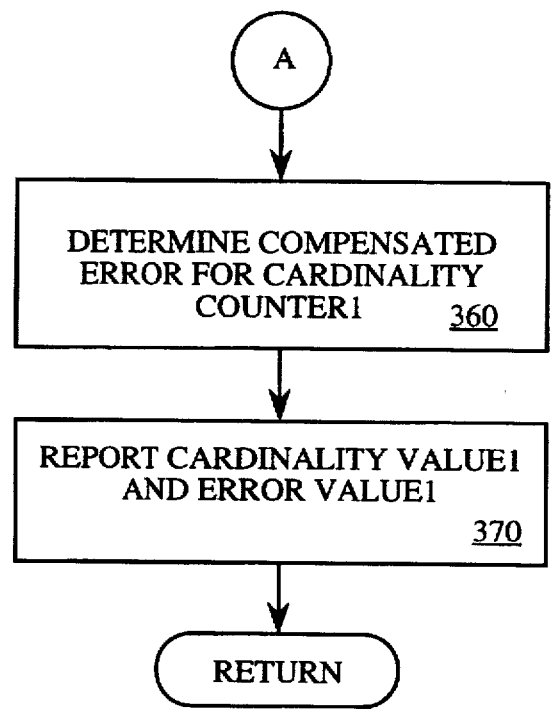

After each entry from data sample 210 is processed, error compensation block 250 applies an error compensation to the distinct cardinality counter value to compensate for expected collision errors. This compensation is dependent on the value of M and is explained in further detail below. The compensated distinct cardinality value generated by block 250 is then output over datapath 290 as the distinct cardinality value1. The collision error after compensation is also output over data path 290 as the error value 1. It is appreciated that blocks 220, 230, 240 and 250 are realized as program instructions within system 112. The corresponding process flow diagram for FIG. 3 is shown in FIG. 5A and FIG. 5B.

A hash collision occurs when two distinct values input to block 220 hash to the same bitmap location with bitmap 260. Because of hash collision, the two distinct values are treated as being duplicates and are counted as one distinct value. The hash collisions introduce an element of error in the number of bits that get set. The number of hash collisions, and consequently the amount of collision error, is reduced by increasing the size of the bitmap (e.g., by increasing the value of M).

Figure 4:
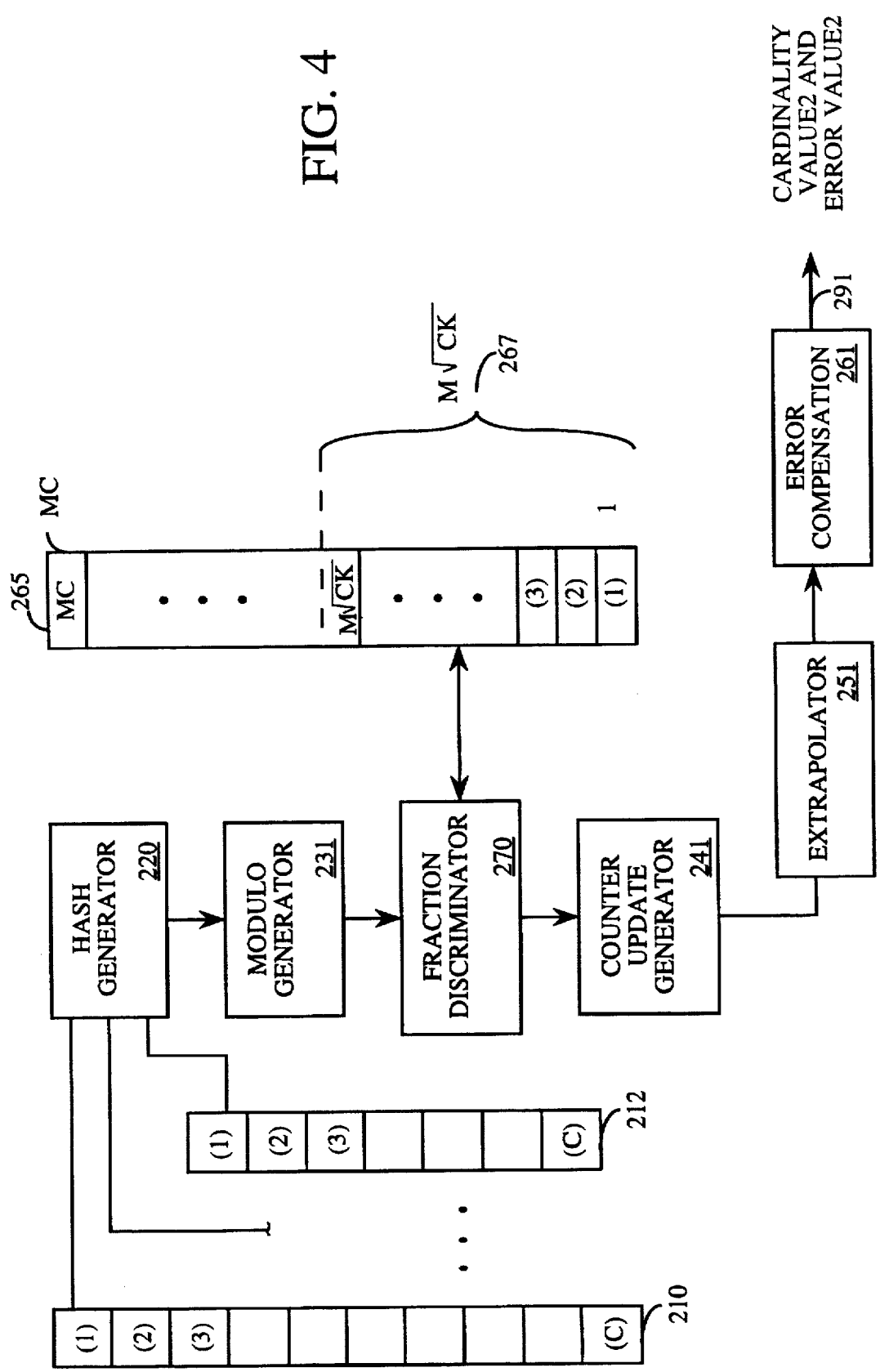
FIG. 4 is a logical block diagram illustrating data flow between processes of the present invention with respect to a second (large) bitmap, and fractional bitmap, used to determine distinct cardinality within the present invention.

FIG. 4 illustrates a logical block diagram and data flow diagram of the portion of the present invention that maintains a second distinct cardinality value using a second hash bitmap. Analogous elements between FIG. 3 and FIG. 4 are similarly numbered. The same data sample is represented as data column 210 and optionally can include more than one data column (e.g., data column 210, . . ., and data column 212) as discussed above. As described below, the configuration of FIG. 4 maintains a separate cardinality value, distinct cardinality value2, in addition to the distinct cardinality value1 maintained by the configuration of FIG. 3. A large bitmap 265 is included in FIG. 4 along with a fractional bitmap 267 that is a fraction of the large bitmap 265.

FIG. 4 includes the hash generator 220 that in one exemplary embodiment contains the same hash function as used in FIG. 3, although different hashing functions can also be used in alternative embodiments. Hash generator 220 accepts input data entry from the data sample (e.g., column 210 or columns 210, . . . , 212) "data sample 210" and generates a fixed length pseudo unique output value. A number of different hash functions can be used for block 220. In operation, an entry is input to hash generator 220 and a hash value is then output to modulo generator block 231. The modulo generator block 231 divides the hash value output from block 220 by the next prime number following the size of the large hash bitmap 265. In this case the size of the large bitmap is M*C where M is the constant used in FIG. 3. The value, C, is the size of the data sample 210. A number of well known procedures, one of which is shown below, can be used in one implementation of the present invention to determine the next prime number, NPN2:

$$NPN2 = NextPrime[M*C]$$

Similar to above, it is a standard practice in a hashing method to use a modulo generator based on a prime number. This use of a prime number reduces collision error. Once the hash value (corresponding to the large bitmap 265) output from block 220 is divided by NPN2, block 231 then takes the remainder value, j, from the division. The value j is input to the fraction discriminator block 270. Block 270 determines if the value j is within the fractional bitmap 267; the fractional bitmap 267 being $M*sqrt(C*K)$ in length. If j is outside the fractional bitmap 267, then it is ignored. If j is within the fractional bitmap 267, then it is passed to the counter update generator 241. At counter update generator block 241, the present invention accepts the remainder value, j, from block 270 and uses this value as an index to address the jth position of the fractional bitmap 267.

Large bitmap 265, as discussed above, contains M*C number of single bit entries, e.g., 265(1), 265(2), 265(3), . . ., 260(M*C). The fraction of the bitmap 265 ("the fractional bitmap 267") contains only $M*sqrt(C*K)$ entries that are initially set to zero. It is appreciated that the fractional bitmap 267 and the small bitmap are separate bitmaps stored in different locations of the computer readable memory of system 112. Upon receiving each value, j, block 241 accesses the jth position of the fraction of bitmap 267 to obtain a single bit value (0 or 1). If the value is 0, then it is set to 1 by block 241 and a second distinct cardinality counter maintained in block 241 is incremented by one. If the value is 1, the value is left at 1 and no counter update is performed. It is appreciated that the second distinct cardinality counter is initially set to zero. Blocks 220, 231, 270, and 241 perform the above for each entry within data sample 210.

After each entry from data sample 210 is processed, block 251 extrapolates the second distinct cardinality count value to approximate the count value across the entire large bitmap 265. This is performed according to the below relationship:

$$\text{2nd Distinct cardinality}_{new} = \text{2nd Distinct cardinality}_{old} * [C/sqrt(C*K)]$$

where 2nd Distinct cardinality$_{old}$ is the value output from block 241. Error compensation block 261 applies an error compensation to the above extrapolated second distinct cardinality counter value to compensate for expected collision errors. This compensation is dependent on the value of M and is explained in further detail below. The compensated distinct cardinality value 2 is then output over line 291.

Figure 6A:
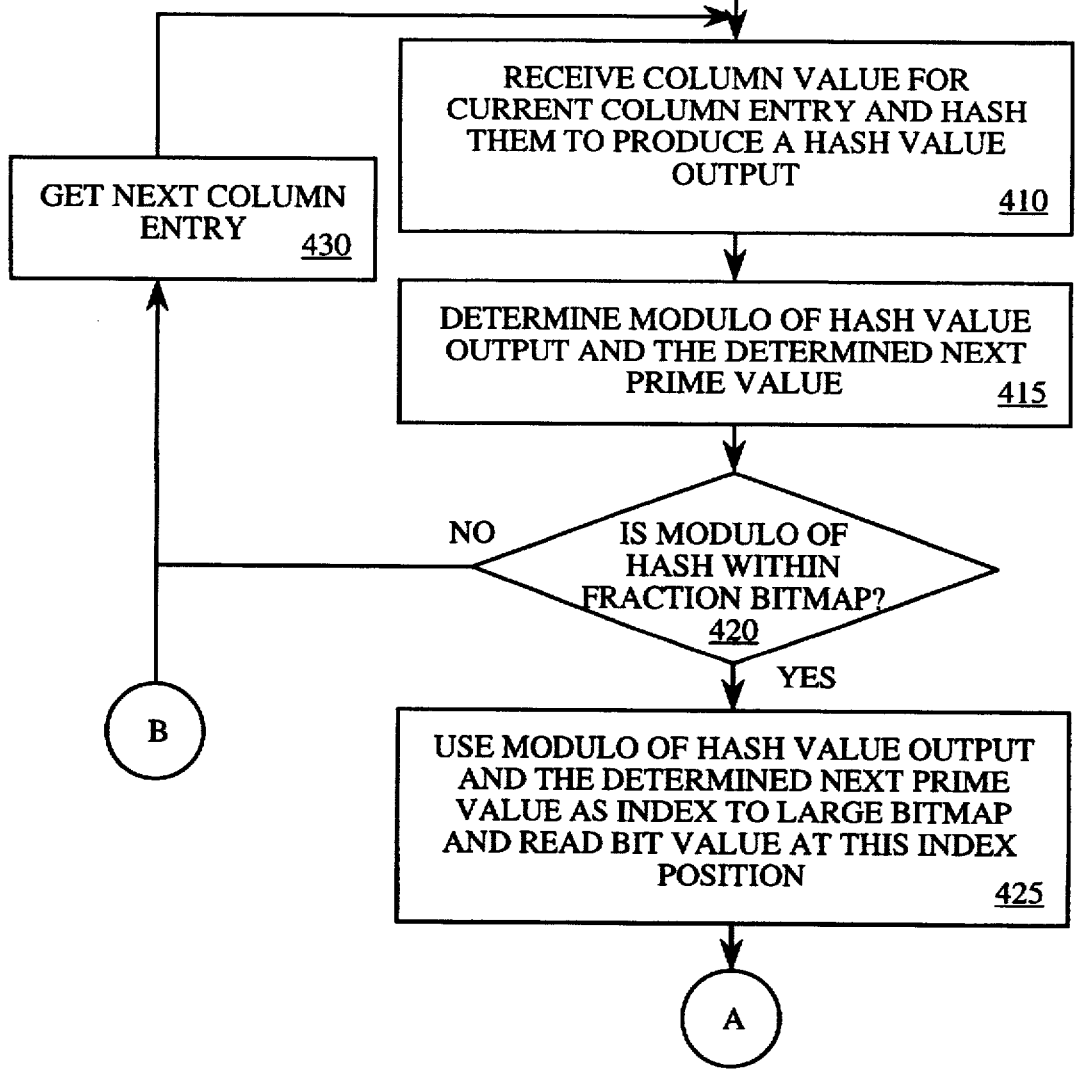
FIG. 6A and FIG. 6B illustrate steps of a process used by the present invention to maintain a distinct cardinality value for a data sample based on the second bitmap and fractional bitmap.
Figure 6B:
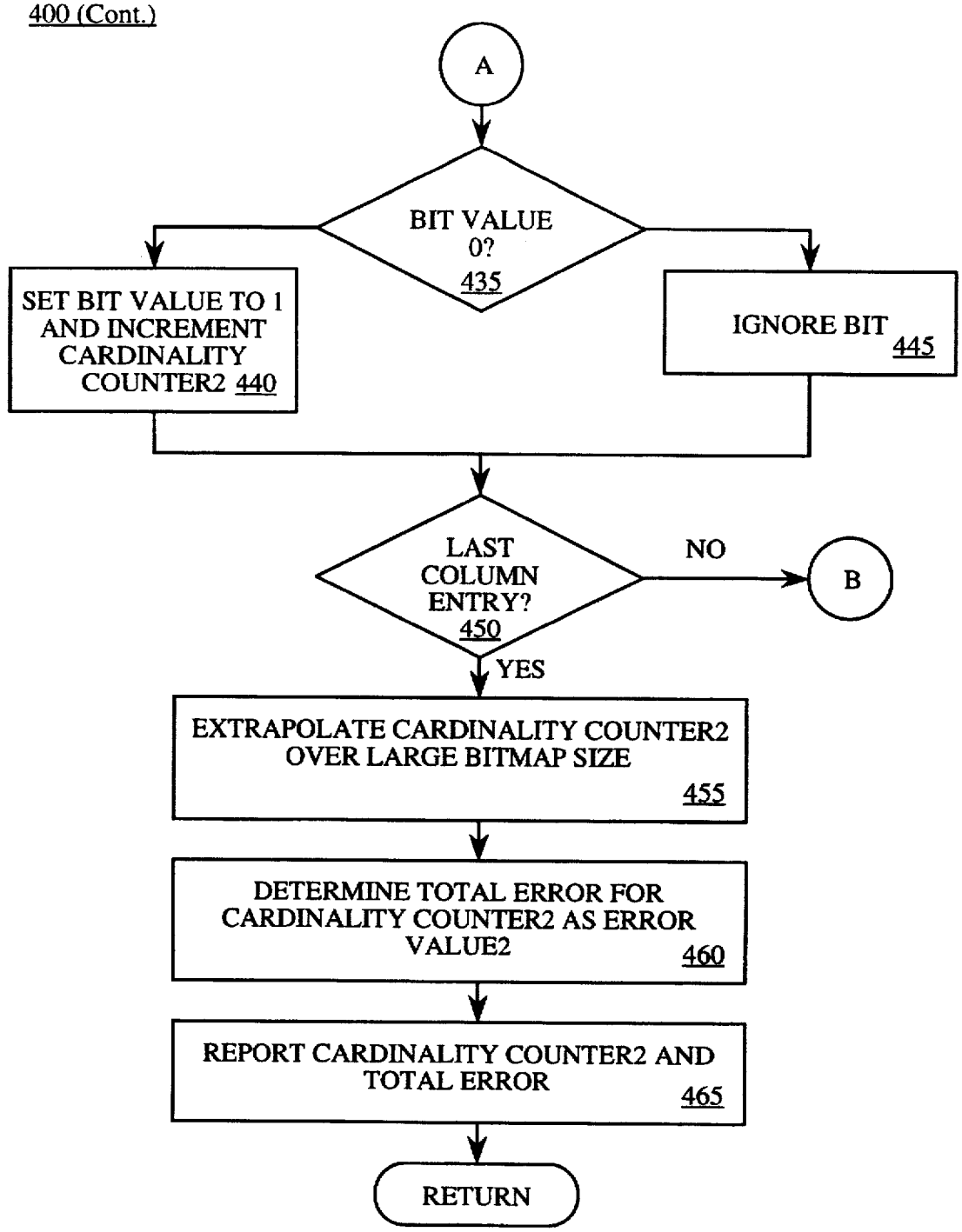

The use of the fractional bitmap 267 within the present invention introduces another type of error which is attributed to the unequal distribution of data sample entries ("keys") hashed into the large bitmap 265. For instance, if the fractional bitmap 267 is 50% of the large bitmap 265, the number of distinct keys hashed into the allocated fraction may not be exactly one half. This type of error is called distribution error and is greatest when the distinct cardinality is very small. For example, if the given data sample has exactly three distinct keys, then 2 keys may hash into one half and 1 key may hash into another half. In this case, the distribution error is +/−50%. However, if the data sample has exactly 100 distinct keys then 52 keys may hash to one half and the other 48 keys may hash to the other half resulting in +/−4% distribution error. The distribution error cannot be compensated as like collision error. In one embodiment, this error is added with the compensated collision error, and output over line 291 as the error value 2. The corresponding process flow diagram for FIG. 4 is shown in FIG. 6A and FIG. 6B.

COLLISION AND DISTRIBUTION ERROR

Since collision error causes the measured distinct cardinality to be lower than the actual value, it can be compensated for based on the value of M. Compensation increases the measurement accuracy. For example, at M=10 the expected collision error is 4.52% in one embodiment. Expected collision error can be compensated for by increasing the measured distinct cardinality (e.g., the distinct cardinality value1 and the distinct cardinality value2) by 4.52%. This will reduce the measurement error but does not eliminate it since the actual collision error incurred can be equal to, less than, or greater than the expected 4.52%. However, generally, at M=10 with compensation for collision error, the measurement error reduces from 4.52% to +/−2.26 %, and therefore, the measurement accuracy increases from 95.48% to 97.74%.

Because the present invention determines the bitmap sizes based on the data sample size, C, if the data sample has relatively small distinct cardinality, the effective value of M will be much larger than 10 when M=10. For example, if the data sample size, C, is 1,000 and the distinct cardinality being measured is 250, then with M=10 the bitmap size is equal to 10,000 and the effective M is 40 with respect to the distinct cardinality. In this case, the collision error incurred is −1.26%.

Therefore, if the data sample has a relatively small number of distinct values, the small bitmap 260 of the present invention measures it with greater accuracy. The fractional bitmap 267 is based on the large bitmap 265 and, therefore, if the distinct cardinality being measured by the present invention is close to the data sample size, C, the fractional bitmap 267 measures it with more accuracy over the small bitmap 260. The above characteristic is useful because the size of the bitmaps can be controlled based on the error tolerance desired. By carefully selecting values of M and K, the measurement of distinct cardinality can be guaranteed within defined error limits.

The amount of distribution error is inversely related to the key density, K (the number of distinct keys hashed to the fraction bitmap). At K=500, the expected distribution error introduced is +/−9.5%, and at K=2000, it is +/−2.78%. Table II gives more distribution error percentages for different K values. If the distinct cardinality being measured is relatively high, the number of distinct keys hashing into the fractional bitmap 267 is much higher than the desired key density, K, and this becomes the effective key density K'. As the effective K' increases, the distribution error incurred is much lower. This is another reason that the fractional bitmap 267 measurement accuracy is higher when the distinct cardinality being measured is higher.

SMALL VS LARGE BITMAP

The fractional bitmap 267 is a fraction of the large bitmap 265. Index positions, i and j (e.g. "keys") are indexed into the large bitmap 265 and the small bitmap 260. However, in the case of the large bitmap 265, only the keys that hash into the allocated fraction are used to set the bits of the bitmap and maintain the second distinct cardinality counter value. Then, the number of bits set in the fraction is extrapolated to the large bitmap size.

Within the present invention, the first bitmap is a small bitmap 260 which is suitable when the distinct cardinality of a data sample is relatively small. The second bitmap is the fractional bitmap 267 which is suitable when the distinct cardinality of the data sample is relatively large. It is appreciated that the small bitmap 260 and the fractional bitmap 267 are actually stored in computer readable memory 102 (e.g., RAM) in separate locations whereas the large bitmap 265 is merely a logical entity that is not stored in memory.

The size of the fractional bitmap 267 as well as the small bitmap is set proportional to $M * sqrt(C*K)$ as discussed above. K is the key density, M is a multiplier constant and C is the data sample size. The key density is the minimum number of distinct values that are expected to hash into the fractional bitmap 267 so that the distinct cardinality can be measured with certain accuracy. For example, in one embodiment, at K=2000 the error introduced is +/−2.78% which leads to a measurement accuracy of 97.22%.

CROSS-OVER POINT

Figure 8:
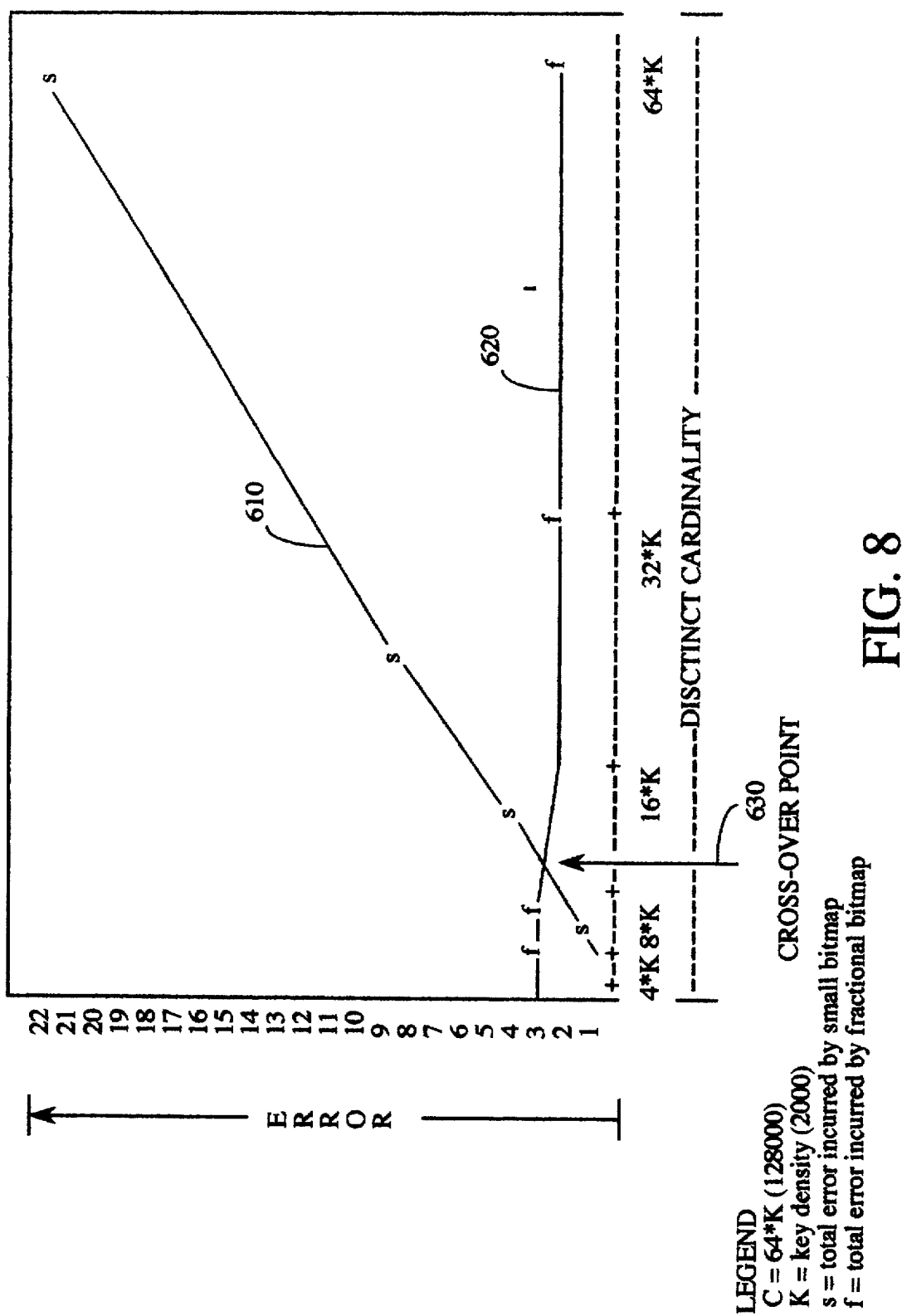
FIG. 8 is a graph of error vs. distinct cardinality for a small bitmap and for a fractional bitmap and illustrates the cross over point in accordance with the present invention.

The distinct cardinality value lies between 1 to C where C is the data sample size. The collision error is linearly proportional to this cardinality value. As this value grows, the collision error grows. But the error growth rate can be optimized by switching from the small bitmap 260 to the fractional bitmap 267, where the error incurred by the fractional bitmap 267 becomes less than the small bitmap 260. This point is called the cross-over point. FIG. 8 illustrates such a representation where error is represented along the vertical while distinct cardinality is represented along the horizontal. Graph 610 represents error for the small bitmap 260 while graph 620 represents error for the fractional bitmap 267. The cross over point is shown as point 630.

The distinct cardinality below this cross-over point 630 is measured more accurately by the small bitmap 260, since the small bitmap 260 incurs only collision error whereas the fractional bitmap 267 incurs both collision and distribution error.

The distinct cardinality above this cross-over point 630 is measured more accurately by the fractional bitmap 267, since the collision error for small bitmap 260 grows larger, as the size of the distinct cardinality value increases beyond this point, than the total error of fractional bitmap 267 (including the distribution error).

Given a known distinct cardinality, a procedure can be developed to determine which bitmap should use based on the expected error. The bitmap which produces less error is selected over the one which produces more error.

For any data sample size of less than $4*K$ (K is key density), the traditional single bitmap hashing is applied. Dual bitmap hashing techniques are used for data sample sizes of $4*K$ or greater. From experiments, the cross-over point typically lies between $sqrt(C*K)$ and $2*sqrt(C*K)$. As the data sample size (C) increases, the cross-over point starts shifting toward $sqrt(C*K)$. Therefore, the fractional bitmap 267 is better suited for larger data samples.

Three examples are presented below to illustrate the manner in which the expected error for small and large bitmaps is calculated in the selection process over which distinct cardinality value to use between the small and large bitmap. First, assume that M (multiplier) is 10, and K (key density) is 2000. The small bitmap size (sBs) is $M*sqrt(C*K)$, the large bitmap size (lBs) is $M*C$, and distinct cardinality (D) lies between 1 to C. Given these known values, the effective values for M and K can be calculated as follow:

--- small bitmap M' = sBs/D
          = M * sqrt(C*K)/D
large bitmap M" = lBs/D
          = M * C/D
effective K' = K * (D/sqrt(C*K))

---

Three examples are illustrated where C is $4*K$ (the minimum data sample size for dual bitmap hashing), $16*K$, and $64*K$. For each example, different cases are provided with the value of distinct cardinality, varying between sqrt (C*K) and C. Using the data from example (3), a plot is presented in FIG. 8, showing two error curves against distinct cardinality, one plot 610 for small bitmap 260 and the other plot 620 for fractional bitmap 267. The values M', M" and K' for the known values of D and C are calculated as follow:

---

(1) When D = sqrt(C*K)
    M' = M * sqrt(C*K)/D
       = M * sqrt(C*K)/sqrt(C*K)
       = M
    K' = K * (D/sqrt(C*K))
       = K * (sqrt(C*K)/sqrt(C*K))
       = K
    M" varies, based on the value of C:
    (1.1) When C = 4*K,
        M" = M * C/D
           = M * (4*K/sqrt(4*K*K))
           = M * (4*K/2*k)
           = 2M
    (1.2) When C = 16*K,
        M" = M * C/D
           = M * (16*K/sqrt(16*K*K))
           = M * (16*K/4*k)
           = 4M -continued

```
    (1.3) When C = 64*K,
         M" = M * C/D
            = M * (64*K/sqrt(64*K*K))
            = M * (64*K/8*k)
            = 8M
(2) When D = 2*sqrt(C*K)
         M' = M * sqrt(C*K)/D
            = M * sqrt(C*K)/sqrt(C*K)
            = M/2
         K' = K * (D/sqrt(C*K))
            = K * (2*sqrt(C*K)/sqrt(C*K))
            = 2K
    M" varies, based on the value of C:
    (2.1) When C = 4*K,
         M" = M * C/D
            = M * (4*K/2*sqrt(4*K*K))
            = M * (4*K/2*2*k)
            = M
    (2.2) When C = 16*K,
         M" = M * C/D
            = M * (16*K/2*sqrt(16*K*K))
            = M * (16*K/2*4*k)
            = 2M
    (2.3) When C = 64*K,
         M" = M * C/D
            = M * (64*K/2*sqrt(64*K*K))
            = M * (64*K/2*8*k)
            = 4M
(3) When D = 4*sqrt(C*K),
         M' = M * sqrt(C*K)/D
            = M * sqrt(C*K)/4*sqrt(C*K)
            = M/4
         K' = K * (D/sqrt(C*K))
            = K * (4*sqrt(C*K)/sqrt(C*K))
            = 4K
    M" varies, based on the value of C:
    (3.1) When C = 4*K,
         M" = M * C/D
            = M * (4*K/4*sqrt(4*K*K))
            = M * (4*K/4*2*k)
            = M/2
    (3.2) When C = 16*K,
         M" = M * C/D
            = M * (16*K/4*sqrt(16*K*K))
            = M * (16*K/4*4*k)
            = M
    (3.3) When C = 64*K,
         M" = M * C/D
            = M * (64*K/4*sqrt(64*K*K))
            = M * (64*K/4*8*k)
            = 2M
(4) When D = 8*sqrt(C*K)
         M' = M * sqrt(C*K)/D
            = M * sqrt(C*K)/8*sqrt(C*K)
            = M/8
         K' = K * (D/sqrt(C*K))
            = K * (8*sqrt(C*K)/sqrt(C*K))
            = 8K
    M" varies, based on the value of C:
    (4.1) When C = 4*K,
         M" = M * C/D
            = M * (4*K/8*sqrt(4*K*K))
            = M * (4*K/8*2*k)
            = M/4
    (4.2) When C = 16*K,
         M" = M * C/D
            = M * (16*K/8*sqrt(16*K*K))
            = M * (16*K/8*4*k)
            = M/2
    (4.3) When C = 64*K,
         M" = M * C/D
            = M * (64*K/8*sqrt(64*K*K))
            = M * (64*K/8*8*k)
            = M
```

The expected errors for the small bitmap and the fraction bitmap are determined for the following cases of different distinct cardinality values varying between sqrt(C*K) and C:

Case (1) D = sqrt(C*K) = 2*K (4000):

small bitmap 260:

| | | |
|---|---|---|
| M' (effective) | = 10 (M) | |
| collision error | = −4.52 | (from table I) |
| | = +/−2.26 | (after compensation) |
| total error | = +/−2.26 | | fraction bitmap 267:

| | | |
|---|---|---|
| M" (effective) | = 20 (2M) | |
| collision error | = −2.73 | (from table I) |
| | = +/−1.34 | (after compensation) |
| K' (effective) | = 2000 (K) | |
| distribution error | = +/−2.78 | (from table II) |
| total error | = +/−4.12 | |

The small bitmap 260 is selected by the present invention in this case.

Case (2) D = 2*sqrt(C*K) = 4*K (8000):

small bitmap 260:

| | | |
|---|---|---|
| M' (effective) | = 5 (M/2) | |
| collision error | = −10.07 | (from table I) |
| | = +/−5.04 | (after compensation) |
| total error | = +/−5.04 | | fraction bitmap 267:

| | | |
|---|---|---|
| M" (effective) | = 10 (M) | |
| collision error | = −4.52 | (from table I) |
| | = +/−2.26 | (after compensation) |
| K' (effective) | = 4000 (2K) | |
| distribution error | = +/−1.68 | (from table II) |
| total error | = +/−3.94 | |

The fractional bitmap is selected in this case by the present invention.

Example (2) C=16*K (32000)

Case (1) D = sqrt(C*K) = 2*K (4000):

small bitmap 260:

| | | |
|---|---|---|
| M' (effective) | = 10 (M) | |
| collision error | = −4.52 | (from table I) |
| | = +/−2.26 | (after compensation) |
| total error | = +/−2.26 | | fraction bitmap 267:

| | | |
|---|---|---|
| M" (effective) | = 40 (4M) | |
| collision error | = −1.26 | (from table I) |
| | = +/−0.63 | (after compensation) |
| K' (effective) | = 2000 (K) | |
| distribution error | = +/−2.78 | (from table II) |
| total error | = +/−3.41 | |

The small bitmap 260 is chosen as the winner in this case.

Case (2) D = 2*sqrt(C*K) = 4*K (8000):

small bitmap 260:

| | | |
|---|---|---|
| M' (effective) | = 5 (M/2) | |
| collision error | = −10.07 | (from table I) |
| | = +/−5.04 | (after compensation) |
| total error | = +/−5.04 | | fraction bitmap 267:

| | | |
|---|---|---|
| M" (effective) | = 20 (2M) | |
| collision error | = −2.73 | (from table I) |

-continued

Case (2) D = 2*sqrt(C*K) = 4*K (8000):

|  |  |  |
|---|---|---|
| K' (effective) | = +/−1.34 | (after compensation) |
|  | = 4000 (2K) |  |
| distribution error | = +/−1.68 | (from table II) |
| total error | = +/−3.02 |  |

The fractional bitmap 267 is selected in this case and beyond.

Case (3) D = 4*sqrt(C*K) = 8*K (16000):

small bitmap 260:

|  |  |  |
|---|---|---|
| M' (effective) | = 2.5 (M/4) |  |
| collision error | = −22.0 | (from table I) |
|  | = +/−11.0 | (after compensation) |
| total error | = +/−11.0 |  | fraction bitmap 267:

|  |  |  |
|---|---|---|
| M" (effective) | = 10 (M) |  |
| collision error | = −4.52 | (from table I) |
|  | = +/−2.26 | (after compensation) |
| K' (effective) | = 8000 (4K) |  |
| distribution error | = +/−0.99 | (from table II) |
| total error | = +/−3.25 |  |

Example (3) C=64*K (128000)

Case (0) D = 0.5*sqrt(C*K) = 4*K (8000)

small bitmap 260:

|  |  |  |
|---|---|---|
| M' (effective) | = 20 (2M) |  |
| collision error | = −2.73 | (from table I) |
|  | = +/−1.67 | (after compensation) |
| total error | = +/−1.67 |  | fraction bitmap 267:

|  |  |  |
|---|---|---|
| M" (effective) | = 160 (16M) |  |
| collision error | = −0.30 | (from table I) |
|  | = +/−0.15 | (after compensation) |
| distribution error | = +/−2.78 | (from table II) |
| total error | = +/−2.93 |  |

The small bitmap 260 is selected in this case.

Case (1) D = sqrt(C*K) = 8*K (16000):

small bitmap 260:

|  |  |  |
|---|---|---|
| M' (effective) | = 10 (M) |  |
| collision error | = −4.52 | (from table I) |
|  | = +/−2.26 | (after compensation) |
| total error | = +/−2.26 |  | fraction bitmap 267:

|  |  |  |
|---|---|---|
| M" (effective) | = 80 (8M) |  |
| collision error | = −0.51 | (from table I) |
|  | = +/−0.26 | (after compensation) |
| K' (effective) | = 2000 (K) |  |
| distribution error | = +/−2.78 | (from table II) |
| total error | = +/−3.04 |  |

The small bitmap 260 is selected in this case.

Case (2) D = 2*sqrt(C*K) = 16*K (32000):

small bitmap 260:

|  |  |  |
|---|---|---|
| M' (effective) | = 5 (M/2) |  |
| collision error | = −10.07 | (from table I) |
|  | = +/−5.04 | (after compensation) |
| total error | = +/−5.04 |  | fraction bitmap 267:

|  |  |  |
|---|---|---|
| M" (effective) | = 40 (4M) |  |
| collision error | = −1.26 | (from table I) |
|  | = +/−0.63 | (after compensation) |
| K' (effective) | = 4000 (2K) |  |
| distribution error | = +/−1.68 | (from table II) |
| total error | = +/−2.31 |  |

The fractional bitmap 267 is selected in this case and beyond.

Case (3) D = 4*sqrt(C*K) = 32*K (64000):

small bitmap 260:

|  |  |  |
|---|---|---|
| M' (effective) | = 2.5 (M/4) |  |
| collision error | = −22.0 | (from table I) |
|  | = +/−11.0 | (after compensation) |
| total error | = +/−11.0 |  | fraction bitmap 267:

|  |  |  |
|---|---|---|
| M" (effective) | = 20 (2M) |  |
| collision error | = −2.73 | (from table I) |
|  | = +/−1.34 | (after compensation) |
| K' (effective) | = 8000 (4K) |  |
| distribution error | = +/−0.99 | (from table II) |
| total error | = +/−2.33 |  |

Case (4) D = 8*sqrt(C*K) = 64*K (128000):

small bitmap 260:

|  |  |  |
|---|---|---|
| M' (effective) | = 1.25 (M/8) |  |
| collision error | = −44.0 | (from table I) |
|  | = +/−22.0 | (after compensation) |
| total error | = +/−22.0 |  | fraction bitmap 267:

|  |  |  |
|---|---|---|
| M" (effective) | = 10 (M) |  |
| collision error | = −4.52 | (from table I) |
|  | = +/−2.26 | (after compensation) |
| K' (effective) | = 16000 (8K) |  |
| distribution error | = +/−0.49 | (from table II) |
| total error | = +/−2.75 |  |

PROCESS FLOW OF THE PRESENT INVENTION

FIG. 5A and FIG. 5B illustrate steps within process 300 performed by the computer system 112 to determine the cardinality value1 and error value 1 based on the small bitmap 260. Process 300 is implemented as steps or instructions stored within computer readable memory units of computer system 112 and executed over a processor of processor(s) 101. Process 300 commences at start where a particular error tolerance is given and an appropriate M and K value are determined based on information provided in Table I and Table II (below). Each bit of the small bitmap 260 is initially reset to zero and a first distinct cardinality counter is also reset to zero. It also performs a determination of the next prime number following the size of the small bitmap 260, M*sqrt(C*K), C being the number of entries of the data sample. A number of well known procedures can be used to perform the above function.

At step 310 of FIG. 5A, the computer system 112 is instructed to receive an entry value of a column 210, or a combination of multiple columns, corresponding to the data sample for which distinct cardinality is to be determined. At step 310, a hash function receives the column entry and generates a first hash value. Although many different types of hash functions can be used by the present invention, in one exemplary embodiment of the present invention, the Cyclic Redundancy Check routine of the VMS operating system is used according to the below syntax:

LIB$CRC crc-table, initial-crc, stream

The usage and arguments of this VMS procedure are well known in the art. In addition to the above procedure, the VMS procedure for constructing a Cyclic Redundancy Check (CRC) Table is also used according to the below syntax:

LIB$CRC_Table polynomial-coefficient, crc-table

The usage and arguments of this second VMS procedure are well known in the art. The output of step 310 is a first hash value based on the input entry.

Step 315 divides the first hash value of step 310 by the next prime number determined at step START and outputs the remainder of the division operation as a first modulo value.

At step 320 of FIG. 5A, the first modulo value (i) is used as an index into the small bitmap 260 that is stored in computer readable memory within system 112. At step 320, the bit value at the first modulo position is read from the small bitmap 260 and the memory (e.g., 102) returns either a 0 or a 1 depending on value of the bit read. At step 325, if the bit value is a 0 processing flows to step 335 and if the bit value is a 1 processing flows to step 330. At step 335, if the bit value is zero then the entry received at step 310 has not been processed before. In this case, a unique entry is encountered so the bit value is set to 1 by a write operation to the first modulo position of memory 102 and the first distinct cardinality counter value (cardinality counter1) is updated by one. Processing then flows to step 340. However, at step 330 the bit value encountered was 1 so this entry is interpreted as a duplicate and not distinct. In this case, the value remains "1" and no counter update is performed. Processing then flows to step 340. It is appreciated that the logical values of "0" and "1" can be reversed in accordance with the present invention process flow 300.

At step 340, the present invention checks if the entry received at step 310 was the last entry of the data sample. If not, processing flows to step 350 where the next entry is obtained and processing then flows to step 310 to process the next data as discussed above. If the last data of the data sample was encountered at step 340, then process 360 of FIG. 5B is entered.

FIG. 5B illustrates step 360 wherein the expected collision error of the cardinality counter1 depends on the effective M' which is computed from dividing the small bitmap size by the cardinality counter1. In general, depending on the selected hash function at step 310, the collision error is known for a particular value of M'. Table I can be used by step 360, in one embodiment of the present invention. For instance, if M'=10, the collision error is 4.52%. Collision error increases when the cardinality counter1 increases, since the effective M' decreases. Collision error is converted into compensated error by dividing by 2, prefixed with +/−. The cardinality counter1 (cardinality value 1) is then compensated for by the determined collision error. Step 370 then reports the compensated error (error value1) and the cardinality counter1 (cardinality value 1) to process 500 (see FIG. 7) and process 300 terminates.

FIG. 6A and FIG. 6B illustrate steps within process 400 performed by the computer system 112 to determine the cardinality value2 and error value 2 based on the fractional bitmap 267 of the large bitmap 265. Process 400 is implemented as steps or instructions stored within computer readable memory units of computer system 112 and executed over a processor of processor(s) 101 and can execute simultaneously with process 300. Process 400 commences at start where an appropriate M and K value are received as computed from process 300. Also, each bit of the fractional bitmap 267 is initially reset to zero and a second distinct cardinality counter (cardinality counter2) is also reset to zero. This step also performs a determination of the next prime number following the size of the large bitmap 265, M*C, C being the number of entries of the data sample. A number of well known procedures can be used within the present invention to perform this function.

At step 410 of FIG. 6A, the computer system 112 is instructed to receive an entry value of a column 210, or a combination of multiple columns, corresponding to the data sample for which distinct cardinality is to be determined. These are the same entries received at step 310 (FIG. 5A). At step 410, a hash function receives the column entry and generates a second hash value. Although many different types of hash functions can be used by the present invention, in one exemplary embodiment the same hash function used at step 310 is used at step 410.

Step 415 divides the second hash value of step 410 by the next prime number determined at step START and outputs the remainder of the division operation as a second modulo value (j).

At step 420, the present invention determines of the second modulo value is within the fractional bitmap 267. The fraction size is M*sqrt(C*K). Therefore, if the second modulo value is above M*sqrt(C*K) then it is not within the fractional bitmap 267 and process flows to step 430. At step 430, the next entry is obtained and processing then flows to step 410 to process the next data. In this case, the second modulo value is ignored since it falls outside of the fractional bitmap 267. If the second modulo value is equal to or less than M*sqrt(C*K), then processing flows from step 420 to step 425.

At step 425, the second modulo value, j, is used as an index into the fractional bitmap 267 that is stored in computer readable memory within system 112. At step 425, the bit value at the second modulo position is read from the fractional bitmap 267 and the memory returns either a 0 or a 1 depending on value of the bit read. Processing then flows to step 435 of FIG. 6B.

At step 435 of FIG. 6B, if the bit value is a 0 processing flows to step 440, and if the bit value is a 1 processing flows to step 445. At step 440, if the bit value is zero then the entry received at step 410 has not been processed before. In this case a unique entry is encountered so the bit value is set to 1 by a write operation to the second modulo position of the fractional bitmap 267 and the second distinct cardinality counter value (cardinality counter2) is updated by one. Processing then flows to step 450. However, at step 445 the bit value encountered was 1 so this entry is interpreted as a duplicate and not distinct. In this case, the value remains "1" and no counter update is performed. Processing then flows to step 450. It is appreciated that the logical values of "0" and "1" can be reversed in accordance with the present invention process flow 400.

At step 450, the present invention checks if the entry received at step 410 was the last entry of the data sample. If not, processing flows to step 430 (FIG. 6A) where the next entry is obtained and processing then flows to step 410 to process the next data. If the last data of the data sample was encountered at step 450, then process 455 is entered.

At step 455, the present invention extrapolates the value of the cardinality counter2 to estimate the distinct cardinality across the entire large bitmap 265. This is performed according to the below relationship:

$$\text{2nd Distinct cardinality}_{new} = \text{2nd Distinct cardinality}_{old} * [C/\text{sqrt}(C*K)]$$

where 2nd Distinct cardinality$_{old}$ is the value maintained by the second cardinality counter (cardinality value2) and 2nd Distinct cardinality$_{new}$ is the value output from step 455.

Step 460 computes two types of errors; one is the expected collision error, and the other is the distribution error. The expected collision error of the cardinality counter2 depends on the effective M" which is computed from dividing the large bitmap size by the cardinality counter2. In general, depending on the selected hash function at step 410, the collision error is known for a particular value of M". Table I can be used by step 460 in one embodiment of the present invention. For instance, if M"=10, the collision error is 4.52%. Collision error increases when the cardinality counter2 increases, since the effective M" decreases. Collision error is converted into compensated error by dividing by 2, prefixed with +/−. The cardinality counter2 is then compensated for by the determined collision error.

The other error, distribution error depends on the effective K' which is computed from dividing K*D by sqrt(C*K). In general, depending on the selected hash function at step 410, the distribution error is known for a particular value of K'. Table II can be used by step 460 in one embodiment of the present invention. For instance, if K=2000, the distribution error is 2.78%. In the preferred embodiment of the present invention, this error cannot be compensated for, like collision error, and is added with the compensation error as total error (error value2). Error value2 is a second probability error factor.

Step 465 of FIG. 6B then reports the total error (error value2) and the cardinality counter2 value, as output from step 460, to process 500 (see FIG. 7) and process 400 terminates.

Figure 7:
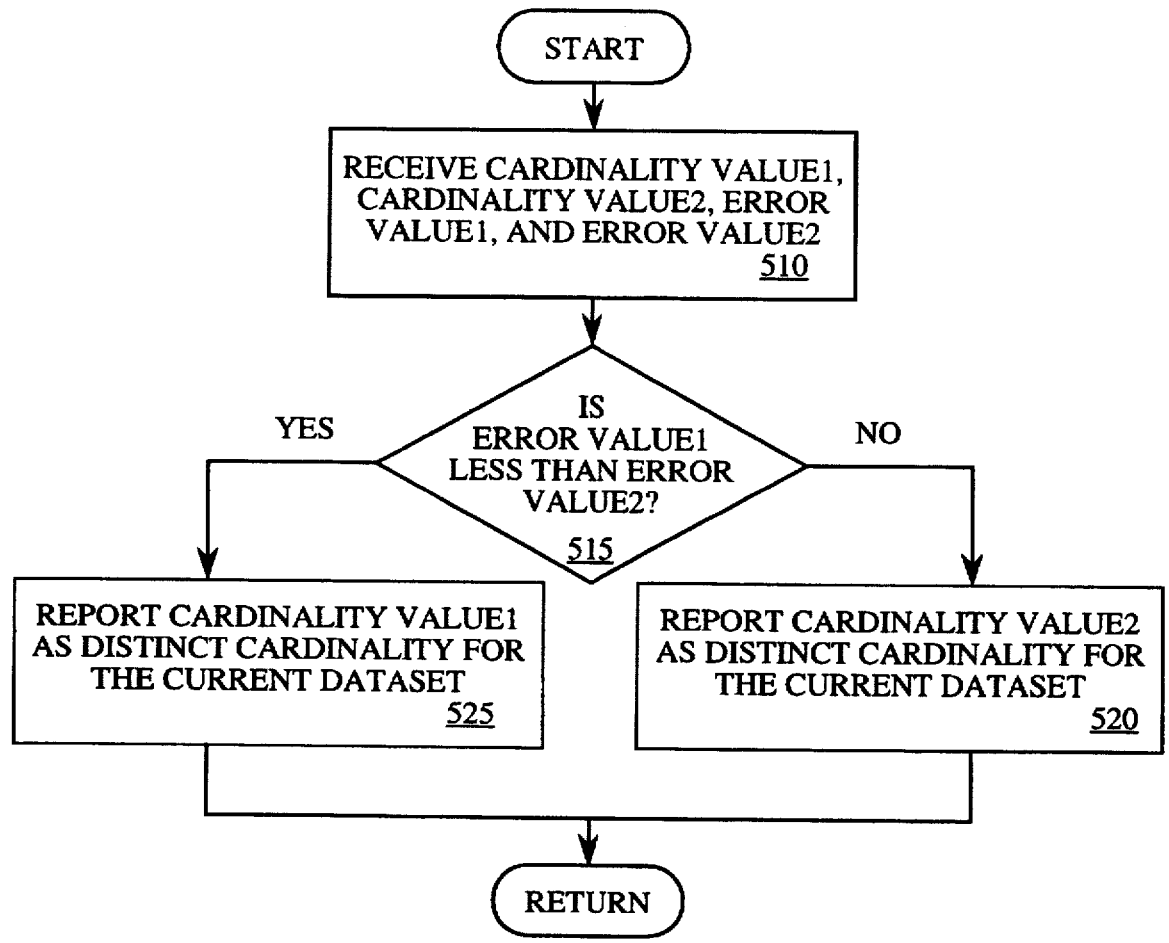
FIG. 7 illustrates steps of a process used by the present invention to select between the distinct cardinality values of the first and second bitmaps to represent the distinct cardinality of the data sample.

FIG. 7 illustrates steps within process 500 performed by the computer system 112 to determine the distinct cardinality value of the data sample by selecting between the values reported by process 300 and process 400. Process 500 is implemented as steps or instructions stored within computer readable memory units of computer system 112 and executed over a processor of processor(s) 101 and executes after process 300 and process 400.

At step 510, process 500 receives the cardinality values reported by process 300 and process 400 which are cardinality value1 and cardinality value2, respectively. Step 510 also receives the error values reported by process 300 and process 400 which are error value1 and error value2, respectively. At step 515, the present invention determines if error value1 is less than error value2. If the error value1 is less than error value2, then processing flows to step 525 where the resultant distinct cardinality value for the data sample is determined to be the cardinality value1. In this case, the small bitmap 260 more accurately determines the distinct cardinality. Process 500 then exits.

In either embodiment, if the error value1 is greater than or equal to error value2, then processing flows to step 520 where the resultant distinct cardinality value for the data sample is determined to be the cardinality value2. In this case, the fractional bitmap 267 of large bitmap 265 more accurately determines the distinct cardinality. Process 500 then exits.

MEMORY USAGE

The total virtual memory (VM) required by the dual bitmap system of the present invention is 2*M*sqrt(C*K). The total VM consumed by the prior art single bitmap system is M*C. Therefore, VM consumed by the prior art single bitmap system is proportional to the data sample size, C. However, the total VM consumed by the present invention dual bitmap system is proportional to the square root of the data sample size, C. This is advantageous because with linear increase in data sample size, C, the rate of growth of VM is sub-linear in accordance with the present invention. By reducing the consumption rate of VM, the present invention reduces overall memory usage and therefore allows the processing of larger data sample sizes before paging is required, if paging is needed at all under the present invention.

BITMAP SIZE CALCULATIONS

Let V=size of VM (virtual memory) allocated in bits

C=size of the data sample

D=distinct cardinality being measured

M=multiplier-constant

K=key density

F=a fraction (a single value between 0.0 and 1.0)

Calculate total VM for the following bitmap hashing techniques:

a) Single bitmap b) Dual bitmaps (Small plus Fractional bitmaps)

Technique (a):

Total VM: V=(M*C) bits

Size of single bitmap=NextPrime (M*C)

Technique (b):

Use small bitmap to measure a distinct cardinality if it is between 1 and D, and use fractional bitmap if it is between D and C. Therefore, only need to use M*D bits for the small bitmap. The size of the fractional bitmap is a fraction of full bitmap. The size of the large bitmap should be M*C, and correspondingly the size of the fractional bitmap will be M*C*F. Total VM: V=size of small bitmap+size of fractional bitmap $$V = (M*D) + (M*C*F)$$

Since there needs to be K number of entries hash into the fractional bitmap so that both bitmaps will measure distinct cardinality with same accuracy when it is D.

K=F*D, or

F=K/D

Substituting for F above, it is found:

$$V = (M*D) + (M*C*K/D)$$

To find the value for D at which total VM, V is minimized, differentiate V with respect to D the above equation, and equate the result to zero.

$$dV/dD = (M*(1)) + (M*C*K*(-1/D^2))$$

$$0 = M - M*C^2*K/D^2$$

Solving for D, it is found:

D=sqrt (C*K)

Inserting the value of D back into the formula for V and simplifying it, it is found Total VM: V=M*sqrt (C*K)+M*sqrt(C*K)

Size of Small bitmap=NextPrime (M*sqrt(C*K))

Size of Fractional bitmap=NextPrime (M*sqrt(C*K))

When to use Technique (a) over Technique (b)

With technique (a), V=M*C

With technique (b), V=2*M*sqrt (C*K)

Technique (b) should be only used when its V is less than that for (a)

2*M*sqrt(C*K)<M*C

Simplifying above equation, we get

C>4*K

Assuming K=2000 is used, we get

C>8000

The above condition tells that single bitmap technique should be used if the data sample size is equal to or less than 8000, and dual bitmaps technique should be used if the sample size is greater than 8000.

In one implementation, the present invention dual hash bitmaps system is advantageous to use over the prior art single bitmap when the sample size, C, is greater than 4*K. The discussion below illustrates the cut-off point above which the present invention is more economical to use over the prior single bitmap system. The present invention is used when the VM consumed by it is less than the VM consumed by the single bitmap system:

2*M*sqrt(C*K)<M*C or

C>4*K

At a key density, K, of 2000 (in one implementation) the above reduces to:

C>8,000.

Therefore, the present invention is more economical to use, assuming an implementation with K=2000, in cases when the sample has more than 8,000 entries.

COLLISION AND DISTRIBUTION ERROR TABLES

Table I AND II below are collision and distribution error tables, respectively, for the invention. Once a particular error tolerance is determined, e.g., by a user, the present invention utilizes the information presented in the below tables to select the proper values for M and K.

TABLE I

| M | Collision Error % |
|---|---|
| 1 | 57.35 |
| 2 | 26.98 |
| 3 | 17.85 |
| 4 | 13.13 |
| 5 | 10.07 |
| 10 | 4.52 |
| 20 | 2.73 |
| 40 | 1.26 |
| 80 | 0.51 |
| 160 | 0.30 |

TABLE II

| K | Distribution Error % |
|---|---|
| 125 | 20.40 |
| 250 | 14.00 |
| 500 | 9.5 |
| 1,000 | 5.3 |
| 2,000 | 2.78 |
| 4,000 | 1.68 |
| 8,000 | 0.99 | the preferred embodiment of the present invention, a system and method for determining distinct cardinality of a data sample using dual hash bitmaps, is thus described. While the present invention has been described in particular embodiments, it should be appreciated that the present invention should not be construed as limited by such embodiments, but rather construed according to the below claims.

What is claimed is:

1. In a computer system having a processor coupled to a bus and a computer readable memory unit coupled to said bus, a method for determining distinct cardinality of a data sample, said method comprising the steps of:
   (a) receiving said data sample, said data sample containing C entries;
   (b) determining a first distinct cardinality value of said data sample using a hashing function and a first bitmap, said first bitmap comprising x entries;
   (c) determining a second distinct cardinality value of said data sample using a hashing function and a fractional bitmap that is a fraction of a second bitmap, said second bitmap comprising y logical entries and said fractional bitmap comprising z entries wherein y is larger than x; and
   (d) selecting between said first distinct cardinality value and said second distinct cardinality value as said distinct cardinality of said data sample, wherein said first bitmap and said fractional bitmap are separate bitmaps and are stored within said computer readable memory unit.

2. A method as described in claim 1 wherein x is M*[sqrt (C*K)], z is M*[sqrt(C*K)], M is a multiplier constant value, and K is a key density constant value and wherein y is M*C.

3. A method as described in claim 1 further comprising the steps of:
   determining a first probability error factor of said first distinct cardinality value; and
   determining a second probability error factor of said second distinct cardinality value; and wherein said step of selecting between said first distinct cardinality value and said second distinct cardinality value comprises the steps of:
   d1) reporting said first distinct cardinality value as said distinct cardinality of said data sample provided said first probability error factor is less than said second probability error factor; and
   d2) reporting said second distinct cardinality value as said distinct cardinality of said data sample provided said first probability error factor is not less than said second probability error factor.

4. A method as described in claim 3 wherein
   said step of determining a first probability error factor of said first distinct cardinality value comprises the step of determining said first probability error factor based on a collision error of said first distinct cardinality value and wherein said step of determining a second probability error factor of said second distinct cardinality value comprises the step of determining said second probability error factor based on a collision error and a distribution error of said second distinct cardinality value.

5. A method as described in claim 1 wherein said step of determining a first distinct cardinality value of said data sample comprises the steps of:
(b1) for each entry of said C entries performing the steps of:
determining a first hash value from said hash function of said step of determining a first distinct cardinality value of said data sample;
determining a first modulo value based on the size of said first bitmap and said first hash value;
indexing said first bitmap based on said first modulo value to access a first bit value; and
provided said first bit value is zero, setting said first bit value to 1 and incrementing said first distinct cardinality value; and
(b2) compensating said first cardinality value for collision error.

6. A method as described in claim 1 wherein said step of determining a second distinct cardinality value of said data sample comprises the steps of:
(c1) for each entry of said C entries performing the steps of:
determining a second hash value from said hash function of said step of determining a second distinct cardinality value of said data sample;
determining a second modulo value based on the size of said second bitmap and said second hash value;
provided said second modulo value is within said fractional bitmap, indexing said fractional bitmap based on said second modulo value to access a second bit value; and
provided said second bit value is zero, and provided further said second modulo value is within said fractional bitmap, setting said second bit value to 1 and incrementing said second distinct cardinality value;
(c2) extrapolating said second distinct cardinality value over said second bitmap from said fractional bitmap; and
(c3) compensating said second cardinality value for collision error.

7. A method as described in claim 5 wherein said step of determining a second distinct cardinality value of said data sample comprises the steps of:
(c1) for each entry of said C entries performing the steps of:
determining a second hash value from said hash function of said step of determining a second distinct cardinality value of said data sample;
determining a second modulo value based on the size of said second bitmap and said second hash value;
provided said second modulo value is within said fractional bitmap, indexing said fractional bitmap based on said second modulo value to access a second bit value; and
provided said second bit value is zero, and provided further said second modulo value is within said fractional bitmap, setting said second bit value to 1 and incrementing said second distinct cardinality value;
(c2) extrapolating said second distinct cardinality value over said second bitmap from said fractional bitmap; and
(c3) compensating said second cardinality value for collision error.

8. A method as described in claim 1 wherein said step of determining a first distinct cardinality value of said data sample and said step of determining a second distinct cardinality value of said data sample are performed simultaneously.

9. In a computer system having a processor coupled to a bus and a computer readable memory unit coupled to said bus, a method for determining distinct cardinality of a data sample, said method comprising the steps of:
(a) receiving said data sample, said data sample containing C entries;
(b) determining a first distinct cardinality value of said data sample using a hashing function and a first bitmap, said first bitmap comprising $M*[sqrt(C*K)]$ entries where M is a multiplier constant value and K is a key density constant value;
(c) determining a second distinct cardinality value of said data sample using a hashing function and a fractional bitmap that is a fraction of a second bitmap, said second bitmap comprising $M*C$ logical entries and said fractional bitmap containing $M*[sqrt(C*K)]$ entries; and
(d) selecting between said first distinct cardinality value and said second distinct cardinality value as said distinct cardinality of said data sample, wherein said first bitmap and said fractional bitmap are separate bitmaps stored within said computer readable memory unit.

10. A method as described in claim 9 further comprising the steps of:
determining a first error value based on a collision error of said first distinct cardinality value; and
determining a second error value based on a collision error and a distribution error of said second distinct cardinality value; and wherein said step of selecting between said first distinct cardinality value and said second distinct cardinality value comprises the steps of:
d1) reporting said first distinct cardinality value as said distinct cardinality of said data sample provided said first error value is less than said second error value; and
d2) reporting said second distinct cardinality value as said distinct cardinality of said data sample provided said first error value is not less than said second error value.

11. A method as described in claim 9 wherein said step of determining a first distinct cardinality value of said data sample comprises the steps of:
(b1) for each entry of said C entries performing the steps of:
determining a first hash value from said hash function of said step of determining a first distinct cardinality value of said data sample;
determining a first modulo value based on the size of said first bitmap and said first hash value;
indexing said first bitmap based on said first modulo value to access a first bit value; and
provided said first bit value is zero, setting said first bit value to 1 and incrementing said first distinct cardinality value; and
(b2) compensating said first cardinality value for collision error.

12. A method as described in claim 11 wherein said step of compensating said first cardinality value for collision error is dependent upon said value M.

13. A method as described in claim 10 wherein said step of determining a second distinct cardinality value of said data sample comprises the steps of:

(c1) for each entry of said C entries performing the steps of:
  determining a second hash value from said hash function of said step of determining a second distinct cardinality value of said data sample;
  determining a second modulo value based on the size of said second bitmap and said second hash value;
  provided said second modulo value is within said fractional bitmap, indexing said fractional bitmap based on said second modulo value to access a second bit value; and
  provided said second bit value is zero, and provided further said second modulo value is within said fractional bitmap, setting said second bit value to 1 and incrementing said second distinct cardinality value;

(c2) extrapolating said second distinct cardinality value over said second bitmap from said fractional bitmap; and (c3) compensating said second cardinality value for collision error.

14. A method as described in claim 13 wherein said step of extrapolating said second distinct cardinality value over said second bitmap from said fractional bitmap is dependent upon said value M and wherein said step of compensating said second cardinality value for collision error is dependent upon said value K.

15. A method as described in claim 11 wherein said step of determining a second distinct cardinality value of said data sample comprises the steps of:

(c1) for each entry of said C entries performing the steps of:
  determining a second hash value from said hash function of said step of determining a second distinct cardinality value of said data sample;
  determining a second modulo value based on the size of said second bitmap and said second hash value;
  provided said second modulo value is within said fractional bitmap, indexing said fractional bitmap based on said second modulo value to access a second bit value; and
  provided said second bit value is zero, and provided further said second modulo value is within said fractional bitmap, setting said second bit value to 1 and incrementing said second distinct cardinality value;

(c2) extrapolating said second distinct cardinality value over said second bitmap from said fractional bitmap; and (c3) compensating said second cardinality value for collision error.

16. A method as described in claim 9 wherein said step of determining a first distinct cardinality value of said data sample and said step of determining a second distinct cardinality value of said data sample are performed simultaneously.

17. A computer system comprising a processor coupled to a bus and a computer readable memory unit coupled to said bus, said computer readable memory unit containing a set of instructions that when executed by said processor causing said computer system to implement a method for determining distinct cardinality of a data sample, said method comprising the steps of:

(a) receiving said data sample, said data sample containing C entries;

(b) determining a first distinct cardinality value of said data sample using a hash function and a first bitmap, said first bitmap comprising x entries;

(c) determining a second distinct cardinality value of said data sample using a hash function and a fractional bitmap that is a fraction of a second bitmap, said second bitmap comprising y logical entries and said fractional bitmap comprising x entries wherein y is larger than x; and (d) selecting between said first distinct cardinality value and said second distinct cardinality value as said distinct cardinality of said data sample, wherein said first bitmap and said fractional bitmap are separate bitmaps and are stored within said computer readable memory unit using different memory locations.

18. A computer system as described in claim 17 wherein x is $M*[sqrt(C*K)]$, where M is a multiplier constant value and K is a key density constant value and wherein y is $M*C$.

19. A computer system as described in claim 18 wherein said method further comprises the steps of:
  determining a first error value based on a collision error of said first distinct cardinality value; and
  determining a second error value based on a collision error and a distribution error of said second distinct cardinality value; and wherein said step of selecting between said first distinct cardinality value and said second distinct cardinality value comprises the steps of:
    d1) reporting said first distinct cardinality value as said distinct cardinality of said data sample provided said first error value is less than said second error value; and
    d2) reporting said second distinct cardinality value as said distinct cardinality of said data sample provided said first error value is not less than said second error value.

20. A computer system as described in claim 18 wherein said step of determining a first distinct cardinality value of said data sample comprises the steps of:

(b1) for each entry of said C entries performing the steps of:
  determining a first hash value from said hash function of said step of determining a first distinct cardinality value of said data sample;
  determining a first modulo value based on the size of said first bitmap and said first hash value;
  indexing said first bitmap based on said first modulo value to access a first bit value; and
  provided said first bit value is zero, setting said first bit value to 1 and incrementing said first distinct cardinality value; and (b2) compensating said first cardinality value for collision error.

21. A computer system as described in claim 18 wherein said step of determining a second distinct cardinality value of said data sample comprises the steps of:

(c1) for each entry of said C entries performing the steps of:
  determining a second hash value from said hash function of said step of determining a second distinct cardinality value of said data sample;
  determining a second modulo value based on the size of said second bitmap and said second hash value;
  provided said second modulo value is within said fractional bitmap, indexing said fractional bitmap based on said second modulo value to access a second bit value; and
  provided said second bit value is zero, and provided further said second modulo value is within said fractional bitmap, setting said second bit value to 1 and incrementing said second distinct cardinality value;

(c2) extrapolating said second distinct cardinality value over said second bitmap from said fractional bitmap; and (c3) compensating said second cardinality value for collision error.

22. A computer system as described in claim 20 wherein said step of determining a second distinct cardinality value of said data sample comprises the steps of:

(c1) for each entry of said C entries performing the steps of:

determining a second hash value from said hash function of said step of determining a second distinct cardinality value of said data sample;

determining a second modulo value based on the size of said second bitmap and said second hash value;

provided said second modulo value is within said fractional bitmap, indexing said fractional bitmap based on said second modulo value to access a second bit value; and provided said second bit value is zero, and provided further said second modulo value is within said fractional bitmap, setting said second bit value to 1 and incrementing said second distinct cardinality value;

(c2) extrapolating said second distinct cardinality value over said second bitmap from said fractional bitmap; and (c3) compensating said second cardinality value for collision error.

23. A computer system as described in claim 18 wherein said step of determining a first distinct cardinality value of said data sample and said step of determining a second distinct cardinality value of said data sample are performed simultaneously.

* * * * *